Feb. 24, 1925.
H. C. HANSON
PISTON RING
Filed Sept. 2, 1922
1,527,681
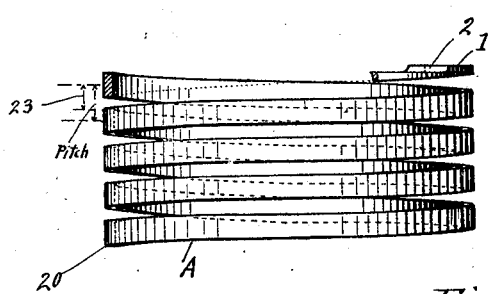
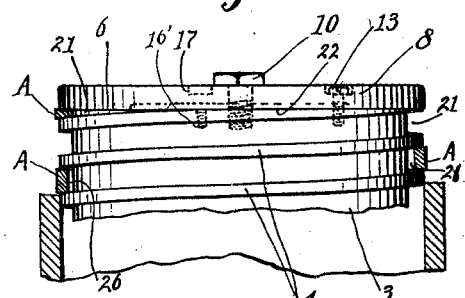
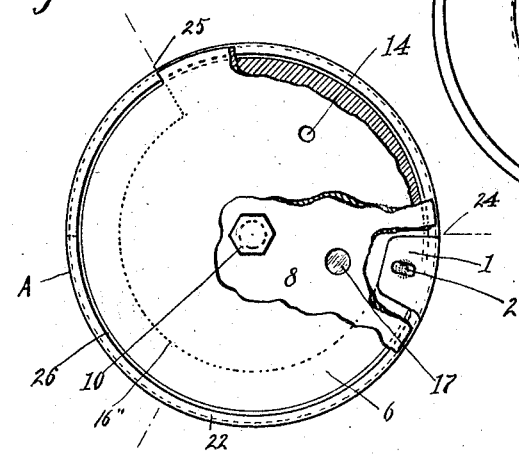
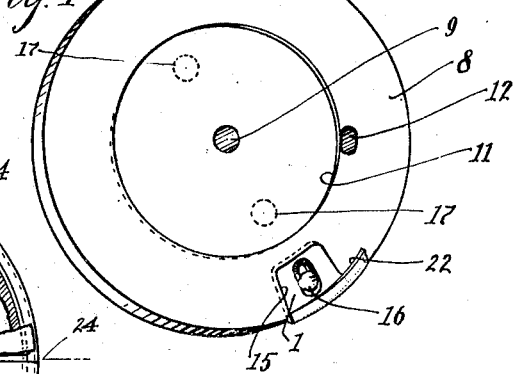
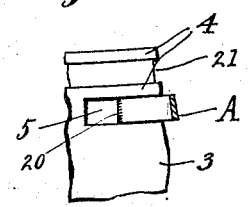
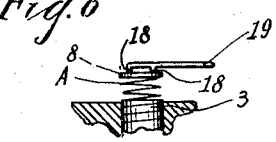
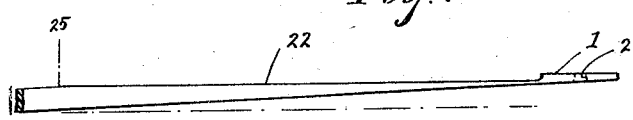
Inventor
Harry C. Hanson
by H. S. Johnson
Attorney.

Patented Feb. 24, 1925.

1,527,681

UNITED STATES PATENT OFFICE.

HARRY C. HANSON, OF ST. PAUL, MINNESOTA.

PISTON RING.

Application filed September 2, 1922. Serial No. 585,883.

*To all whom it may concern:*

Be it known that I, HARRY C. HANSON, a citizen of the United States, residing at St. Paul, in the county of Ramsey and State of Minnesota, have invented certain new and useful Improvements in Piston Rings, of which the following is a specification.

This invention relates to piston packing rings for internal combustion engines, and has for its object to provide a one piece, jointless piston ring, which will function singly, with improved efficiency, as a substitute for the piston rings ordinarily employed at the top of the piston, my improved ring having approximately the same circumferential effective packing length, without any intermediate lap joints.

A further object of the invention, is the provision of a unitary piston ring having a sliding surface, which is approximately equal to the aggregate sliding surface of the upper piston rings ordinarily employed, but which may be inserted in the piston ring grooves without detaching the pistons from the connecting rods, and which will slidably engage, under its own spring stress, the wall of the cylinder bore in unbroken continuity, in such a manner, as to secure an evenly distributed radially directed pressure thereagainst, as distinguished from the pressure of ordinary split rings, and many of those employing auxiliary spring rings for backing up the split ring, to secure ample side pressure.

Further, my improved ring is cheap to manufacture, in view of the number of rings it displaces, and involves no coacting separate parts relied upon to slide upon one another to be effective.

Other objects of the invention will be pointed out as this specification progresses.

In the accompanying drawings:

Figure 1, is a side elevation of my improved packing ring.

Figure 2, is a top view of same, showing it applied to the piston, the latter being partly broken away.

Figure 3, is a fragmentary side elevation of the cylinder and piston, showing the helical packing ring groove.

Figure 4, is a perspective view of the piston top plate or cap, forming part of my invention.

Figure 5, is a perspective view of a fragment of the piston, showing the end of the piston groove and ring.

Figure 6, is a diagrammatic fragmentary side elevation partly in section, and drawn to a reduced scale, of a cylinder block, showing a piston therein, and illustrating the mode of inserting the packing ring in the piston groove; and Figure 7, is a side view of a part of the upper coil of the piston ring, showing it straightened out.

My improved packing ring, designated by the letter A, comprises a flat strip of suitable springy metal, rectangular in cross section, and shaped to form a helical spring ring or helix of preferably four coils of uniform pitch and diameter, the upper end of the ring being formed to present a flat top side disposed in a plane at right angles to the axis of the helix, or, in other words, the helical ring is cut off square at the top. The upper extremity of the coiled strip, is provided with an inwardly extending, horizontally disposed lug or extension 1, having a radially disposed slotted opening 2.

The piston 3, is formed with an external square thread 4, having a pitch equal to the pitch of the coils of the piston ring, and being in extent a trifle longer than said ring to form a clearance 5 at the lower extremity of the latter, when the square end of the ring is flush with the top of the piston. The clearance mentioned permits the piston ring to expand and contract circumferentially, responsive to a change in temperature of the parts, due to the activities of the motor, as when running at low or high speed. The under side of the lug or extension 1, is located in the plane of the top of the piston ring, and rests on the top 6 of the piston 3, when mounted in working position. The outside of the thread 4 of the piston, is preferably equal in diameter to the diameter of the rest of the piston, which is usually a trifle smaller than the bore of the cylinder.

The piston ring is originally made a trifle larger in diameter than the bore of the cylinder, as is plainly indicated in Figure 3, wherein the piston is shown partly projected into the cylinder, and the piston ring is shown in its unflexed original state.

Secured to the top of the piston, and being of same diameter, is the top plate or cap 8, having a central bolt opening 9, through which loosely extends the cap screw 10, which latter is threaded into the top of the piston, as indicated in dotted lines in Figure 3. The cap is preferably recessed centrally in the under side, as at 11, in order to secure a firm bearing around the outer edge thereof in connection with the piston. The cap is further provided with the elongated opening 12, located off center, and adapted to receive a suitable screw 13, which latter is threaded in the opening 14 in the top of the piston, whereby, with the cap screw 10, the top plate may be firmly and non-rotatably secured to the top of the piston. The under side of the top plate is further formed with a recess 15, shaped to receive the lug 1 flatwise, so that the under side of said lug will be flush with the under side of the top plate, the lug being slidably held in said recess by means of the countersunk screw 16, the slotted hole 2 being countersunk accordingly, and the hole for the screw extending through the top plate, and being in register with the tapped hole 16′ in the top of the piston.

The cap or top plate is further provided with shallow, circular recesses 17, one on either side of the center, said recesses being adapted to receive the studs 18 of the spanner wrench 19, whereby the cap may be rotated.

The recess 15, is properly located on the under side of the cap 8, to hold the piston ring A concentric therewith, the screw 16 being applied in a manner to permit the upper extremity of the piston ring to slide in the slotted opening 2, to thereby give it freedom of action to press against the wall of the cylinder.

As hereinbefore stated, the ring is normally slightly larger in diameter than the bore of the cylinder, commonly termed oversize, and is placed on the piston by simply screwing the coiled strip from above downwards into the grooves 21, formed by the threads of the piston (as is diagrammatically indicated in Figure 6 of the drawings), until the cap 8 rests firmly on top of the piston, as shown in Figure 3, when the screws 10 and 13 are applied to firmly secure the cap. The packing ring is thus firmly anchored at its upper extremity (by means of the lug 1 in the recess 15) to the piston, while its lower free end 20 is located (Figure 5) adjacent to the clearing space 5. Obviously, with the application of heat, the packing ring will expand circumferentially, and being anchored at its upper extremity, the strip of which it is composed will elongate and be compelled to traverse the piston groove 21 downwardly during expansion, and thereby be projected into the clearance space 5. This longitudinal sliding movement of the ring strip varies constantly in extent, in direct proportion to the variation of temperature of the piston, which change in temperature is due to the changing of speeds of the motor, whereby the relative position of the sliding surface of the ring, with respect to the bore of the cylinder, is constantly changing, thus inducing even wearing of the bore, and avoiding pitting of the latter. Further, by having a helical one piece ring, oil, ordinarily accumulating above or between the packing rings, will be conducted, or will work itself down the inclined coils of the ring to the clearance space 5, where it will be discharged.

As the ring is screwed into the piston groove, it is flexed to assume a smaller diameter, the outwardly directed stress thereby developed, pressing the ring firmly against the wall of the cylinder to serve as a packing. As the ring is a continuous helix, here shown constituting four (4) rings, the pressure, obviously, is uniform and is directed radially outwardly against the cylinder wall, as distinguished from ordinary split rings, where it becomes necessary to stagger the splits thereof, in order to secure more or less even outward pressure. As described, the under side of the top plate 8 forms a joint with the top surface 22, of the squared end of the packing ring. Since the latter is anchored to the top plate, this joint remains unmoved during expansion.

Referring to Figures 1 and 2, the pitch of the ring, as here shown, is such, that the width of the metal strip of which it is composed, is approximately two-thirds (⅔) of the pitch, as shown at 23, and, therefore, the top surface 22 of the ring will extend two-thirds of a revolution, from the line 24 to the line 25, at which latter point the groove of the piston being at its full width. It will be observed that from the lines 24 to 25, the clearance space 26 back of the ring, is exposed and opens upwardly. The object of the top plate 8, is to cover this opening and make the joint between the upper edge 22 and the under side of the top plate. Thus, I secure a leak proof joint at the juncture of the packing ring with the plate. It is to be understood, that the ring may be inserted, without the top plate being secured thereto, and the top plate later placed in position, in which case the screw 13 need not be used, as the terminal of the packing ring will still be anchored in the recess 15.

While I have shown the plate like lug 1, to cover but part of the clearance 26, I can extend it to the point 25 (Figure 2) as indicated by the fine dotted lines 16″, whereby I effectually seal said clearance space. When I thus extend said lug, the recess 15 is enlarged accordingly; or I reverse the screw 16 and thread it into the opening 16′, when the top plate may be dispensed with. In either case, the top plate 8, or the lug 1, constitute a cover secured to the packing ring, for sealing the joint between the latter and the piston at the top of the latter.

The helical ring may be said to be expandible longitudinally in the helical groove of the piston, from a fixed point located at the top of the packing ring.

I claim:

1. In a piston packing ring, the combination with a piston having a square screw thread in the periphery thereof; of a plate removably secured to the piston head, a metal helix engaging the screw thread to form a seal, and means for removably connecting the plate to the metal helix.

2. In a piston packing ring, the combination with a piston having an external square screw thread of uniform diameter, terminating in the plane of the top thereof; of a strip of flat, springy metal, rectangular in cross section and curved flatwise to slidingly fit in the space between said screw threads and extend uniformly beyond the face of the threads and terminating flush with the top of the piston, a plate covering the top of the piston and removably secured thereto, and a slidable connection between said plate and piston ring.

3. In a piston packing ring, the combination with a piston having a square screw thread in the periphery thereof; of a plate removably secured to the piston head and in contact therewith at its circumference and having a recess therein, a metal helix engaging the screw thread to form a seal, and means to removably connect the helix to the recess in the removable plate.

4. In a piston packing ring, the combination with a piston having an external square screw thread terminating in the plane of the top thereof; of a helical packing ring larger in diameter than said piston and made of springy metal and shaped to be screwed into engagement with said thread, and be spaced from the bottom thereof, and terminate short of the end thereof, and be flush with the top of the piston, and a plate secured to the top of the packing ring extending over the space separating the latter from the bottom of said thread to close said space and resting on the top of the piston, and adapted to be secured thereto.

In testimony whereof I affix my signature.

HARRY C. HANSON.